United States Patent

[11] 3,620,715

| [72] | Inventors | Sanaa E. Khalafalla;<br>Sequoya L. Payne, both of Minneapolis, Minn. |
|---|---|---|
| [21] | Appl. No. | 844,648 |
| [22] | Filed | July 24, 1969 |
| [45] | Patented | Nov. 16, 1971 |
| [73] | Assignee | The United States of America as represented by the Secretary of the Interior |

[54] STEEL SCRAP OXIDATION ACCELERATION BY SURFACE IMPREGNATION TECHNIQUES
7 Claims, No Drawings

[52] U.S. Cl............. 75/1, 75/44 S. 148/6.35
[51] Int. Cl......... C21b 1/00, C23f 7/04
[50] Field of Search... 75/1, 44 S; 148/6.35

[56] References Cited
UNITED STATES PATENTS

| 2,728,696 | 12/1955 | Singer | 148/6.35 |
| 2,849,344 | 8/1958 | Cramer | 148/6.35 X |
| 3,273,993 | 9/1966 | Melcher | 75/1 |
| 3,483,110 | 12/1969 | Rozgonyi | 148/6.35 X |

FOREIGN PATENTS

| 878,183 | 9/1961 | Great Britain | 148/6.35 |

*Primary Examiner*—Allen B. Curtis
*Attorneys*—Ernest S. Cohen and M. Howard Silverstein

ABSTRACT: The surface of scrap steel from discarded auto bodies, etc is impregnated with minute amounts of an oxide of an oxidation acceleration agent containing said agent in its highest valence state by immersion in a solution of the agent or by spraying. After such treatment the steel will be rapidly oxidized during a reduction-roasting operation.

STEEL SCRAP OXIDATION ACCELERATION BY SURFACE IMPREGNATION TECHNIQUES

This invention relates to the reclamation of steel scrap.

There is an ever-increasing concern in out country with regard to efficient resource utilization and solid waste disposal problems. Toward this end ways are now being sought to economically utilize discarded automobiles bodies, junked refrigerators and the like, instead of piling them up in obnoxious heaps which disturb the natural beauty and scenery of the countryside.

U.S. Pat. No. 3,273,993 discloses a method of employing scrap iron such as turnings and borings in a reduction-roasting operation to convert a low grade nonmagnetic iron ore such as hematite to magnetite. During the process, it is important that the scrap rapidly oxidize in a $CO_2$-$H_2O$ atmosphere. As such, this process is unsuitable for scrap steel since the steel found in scrap sources such as discarded auto bodies is originally manufactured to withstand nonmagnetic whereby it oxidizes too slowly and is generally unsuitable for such a reclamation process. Although some work has been done on accelerating the rate of oxidation of metals by alloying them with metals which are so-called oxidation accelerators such as vanadium, molybdenum, bismuth or lead, this technique is impractical with regard to the oxidation of steel scrap because of the need for substantial quantities of the alloying element. A discussion of such accelerators is given in "Oxidation of Metals" by Karl Hauffe, Plenum Press, New York, 1965, beginning at page 250.

We have now discovered that metals essentially composed of iron which previously have been treated to withstand corrosion e.g., steel) can be rapidly oxidized by first impregnating the surface of the metal with minute amounts of an oxide of any of the known oxidation accelerator metals, which oxide contains the accelerator metal in its highest valence state. Exemplary oxides include vanadium pentoxide, molybdenum trioxide, lead sesquioxide and bismuth pentoxide. Oxide impregnation is accomplished, for example, by spraying the metal to be oxidized with a solution which is capable of depositing the desired accelerator metal oxide, or by immersing the metal to be oxidized in the solution.

One theory advanced in explanation of the subject invention is that the surface impregnation of the steel with the agent results, during subsequent high-temperature oxidation, in the formation of low-melting eutectics among the oxide scales on the surface of the steel which allows rapid atomic or ionic diffusion through the oxide layer for sustenance of the oxidation reaction.

It is therefore an object of the present invention to treat steel scrap and other metals essentially composed of iron with minute amounts of an oxidation accelerator. Another object is to accelerate the oxidation of steel scrap such as discarded auto bodies and refrigerators. A further object is to accelerate the steel scrap oxidation in a reduction-roasting operation wherein the scrap is employed to convert low-grade iron ore to magnetite. Other objects and advantages will be obvious from the following more detailed description of the invention.

In the practice of the invention the scrap is simply pickled (immersed) in an aqueous solution containing the oxidation accelerator metal in its highest valence state, and capable of depositing the oxide of the accelerator metal. An exemplary suitable solution is a solution of an alkali metal salt or ammonium salt of the accelerator metal oxyacid with highest valency. Solution concentrations preferably range from 36 g./l. of accelerator metal to about 73 g./l. Optimum pickling time depends on many factors including solution concentration and should be experimentally determined for each agent. Surprisingly, shorter pickling times result in greater oxidation acceleration. In most instances, immersion treatment for ten to 20 seconds yields a steel that is rapidly oxidized. As an alternative to immersion, the solution can be sprayed on the scrap metal.

After removal from solution the metal can then be employed in a reduction-roasting operation which is represented, overall, by the following cyclic process in which magnetite is assumed to be formed from both metallic iron and the hematitic ore.

1. $3\ Fe + 4\ CO_2\ (or\ 4\ H_2O)\ \rightarrow\ Fe_3O_4 + 4\ CO\ (or\ 4\ H_2)$
2. $12\ Fe_2O_3 + 4\ CO\ (or\ 4\ H_2)\ \rightarrow\ 8\ Fe_3O_4 + 4\ CO_2\ (or\ 4\ H_2O)$ As can be seen from these formulae, it is important that the oxidation reaction (1) proceed at the same rate as the reduction reaction, (2) since reaction (1) provides the reductants in reaction (2) which in turn provides the oxidants in reaction (1). The surface impregnation of the steel with the oxidation accelerator allows this necessary rapid oxidation.

The effectiveness of treatment by the process of the present invention is illustrated by the following examples:

Example 1

Steel strips cut from new, unpainted, low-carbon, deep-drawing steel fender skirts and hoods, and each measuring 7×2×.1 cm. were immersed for various periods of time in a 10 percent aqueous solution of sodium metavandate, $NaVO_3 \cdot H_2O$. The strips were then removed and oxidized at 900° C. with an 85% $CO_2$—15% CO gas mixture. According to the iron-oxygen-carbon phase diagram, the oxidation potential of this mixture is thermodynamically capable of forming magnetite from iron. The progress of the oxidation process was followed with time by recording the weight-gain of the oxidizable sample. Percent oxidation was calculated on the basis of the original scrap weight prior to the vanadate bat and on the assumption that oxygen uptake would continue until the iron content of the sample was transformed to magnetite. Oxidation data for steel strips pickled in 10 percent sodium metavanadate for periods of 10 seconds, 6 hours, and 72 hours are given in the following table.

TABLE 1

| Oxidation time minutes | Percent Oxidation | | | |
|---|---|---|---|---|
| | Untreated | 10 seconds | Impregnation time 6 hours | 72 hours |
| 10 | 0.479 | 3.943 | 3.102 | 1.613 |
| 50 | 3.362 | 14.589 | 11.870 | 6.352 |
| 100 | 7.873 | 24.151 | 20.280 | 12.252 |
| 200 | 17.924 | 38.918 | 34.357 | 24.268 |
| 300 | 26.471 | 49.880 | | 35.144 |

It is seen from table 1 that the best results are obtained for shorter pickling times and that the percent oxidation in the first 10 minutes is increased by about eightfold for samples pickled for only 10 seconds.

EXAMPLE 2

In another group of tests, the percent of vanadate in the pickling bath was changed and its effect on the oxidation kinetics of steel scrap was observed. Impregnation was conducted for 6 hours and oxidation tests run at 900° C. with 85% $CO_2$–15ries of tests are contained in the following table.

TABLE 2

| Oxidation time, minutes | Percent oxidation | | | | |
|---|---|---|---|---|---|
| | Vanadate 0.01 pct. | Vanadate 0.10 pct. | Vanadate 1.0 pct. | Vandate 10.0 pct. | Vanadate 20.0 pct. |
| 10 | 0.775 | 0.637 | 0.777 | 3.102 | 5.094 |
| 50 | 4.570 | 3.108 | 4.105 | 11.870 | 17.642 |
| 100 | 10.967 | 6.454 | 8.708 | 20.280 | 46.021 |
| 300 | 34.113 | 19.861 | | | 58.333 |

It is seen from table 2 that for vanadate concentrations above 0.1 percent, the oxidation rate always increased with increasing vanadium content.

What is claimed is:

1. In a process including the step of oxidizing a metal which has previously been treated to withstand corrosion, said metal essentially composed or iron, wherein said metal is combined with an oxidation accelerator prior to said oxidation, the improvement comprising combining said metal with said accelerator by impregnating the surface of said metal with minute amounts of an oxide of said oxidation accelerator, said oxide selected from the group consisting of vanadium pentoxide, molybdenum trioxide and lead sesquioxide.

2. The process of claim 1 wherein said impregnation is accomplished by spraying said metal with an aqueous solution of said accelerator or by immersing said metal in said solution.

3. The process of claim 1 wherein said metal is steel scrap.

4. The process of claim 2 wherein said metal is steel scrap.

5. The process of claim 2 wherein said solution is selected from the group consisting of ammonium and alkali metal salt solutions of an oxyacid of said accelerator.

6. The process of claim 5 wherein said impregnation step is accomplished by immersion in said solution for about 10 to 20 seconds.

7. A process for employing steel scrap as a metallic iron source in a low-grade nonmagnetic iron ore reduction-roasting operation wherein said metallic iron source is rapidly oxidized while said ore is simultaneously reduced comprising
a. impregnating the surface of said scrap with minute amounts of the oxide of an oxidation accelerator, said oxide selected from the group consisting of vanadium pentoxide, molybdenum trioxide, lead sesquioxide and bismuth pentoxide; and
b. employing said impregnated scrap as said metallic iron source in said reduction operation.

* * * * *

UNITED STATES PATENT OFFICE
CERTIFICATE OF CORRECTION

Patent No. 3,620,715    Dated  November 16, 1971

Inventor(s) Sanaa E. Khalafalla, et al

It is certified that error appears in the above-identified patent and that said Letters Patent are hereby corrected as shown below:

On the cover sheet [72] "Sequoya L. Payne" should read -- Sequoyah L. Payne -- . Column 1, line 4, "out" should read -- our -- ; line 7, "automobiles" should read -- automobile -- ; line 19, "nonmagnetic" should read -- corrosion -- ; line 31, "e.g.," should read -- (e.g., -- . Column 2, line 3, "$4CO_2$(or $4H_2O$)    $Fe_3O_4$" should read -- $4CO_2$(or $4H_2O$)$\longrightarrow Fe_3O_4$ --; line 4, "$4CO$(or $4H_2$)    $8Fe_3O_4$," should read -- $4CO$(or $4H_2$)$\longrightarrow 8Fe_3O_4$ -- ; line 25, "bat" should read -- bath -- ; lines 35-45, Table 1 should be canceled and the following inserted:

TABLE I

| Oxidation time minutes | Percent Oxidation | | | |
|---|---|---|---|---|
| | Untreated | Impregnation time | | |
| | | 10 seconds | 6 hours | 72 hours |
| 10 | 0.479 | 3.943 | 3.102 | 1.613 |
| 50 | 3.362 | 14.589 | 11.870 | 6.152 |
| 100 | 7.873 | 24.151 | 20.280 | 12.252 |
| 200 | 17.924 | 38.918 | 34.357 | 24.268 |
| 300 | 26.471 | 49.880 | | 35.144 | line 57, Example 2, "CO -15ries" should read -- CO -15 percent CO gas mixture. Oxidation obtained in this series -- ; lines 60-65, Table 2 should be canceled and the following inserted:

TABLE 2

| Oxidation time minutes | Percent oxidation | | | | |
|---|---|---|---|---|---|
| | Vanadate 0.01 pct | Vanadate 0.10 pct | Vanadate 1.0 pct | Vanadate 10.0 pct | Vanadate 20.0 pct |
| 10 | 0.775 | 0.617 | 0.777 | 3.102 | 5.094 |
| 50 | 4.570 | 1.108 | 4.105 | 11.870 | 17.642 |
| 100 | 10.967 | 6.454 | 8.708 | 20.280 | 46.021 |
| 300 | 34.113 | 19.861 | | | 58.333 |

UNITED STATES PATENT OFFICE
CERTIFICATE OF CORRECTION

Patent No. 3,620,715     Dated November 16, 1971

Inventor(s)  Sanaa E. Khalafalla, et al     -2-

It is certified that error appears in the above-identified patent and that said Letters Patent are hereby corrected as shown below:

Column 3, line 3, "or" should read -- of -- .

Signed and sealed this 24th day of October 1972.

(SEAL)
Attest:

EDWARD M. FLETCHER, JR.
Attesting Officer

ROBERT GOTTSCHALK
Commissioner of Patents